UNITED STATES PATENT OFFICE.

LORENZO FAGERSTEN, OF CHICAGO, ILLINOIS, ASSIGNOR OF ONE-HALF TO JAMES B. MARSH, OF SAME PLACE.

PROCESS OF TESTING FACTITIOUS BUTTER.

SPECIFICATION forming part of Letters Patent No. 344,730, dated June 29, 1886.

Application filed July 6, 1885. Serial No. 170,837. (No specimens.)

*To all whom it may concern:*

Be it known that I, LORENZO FAGERSTEN, a citizen of the United States, residing at Chicago, in the county of Cook and State of Illinois, have invented a new and useful Improved Process of Treating Butter and its Bogus Compounds, whereby the genuine may be distinguished from the spurious article, of which the following is a specification.

It is well known that enormous quantities of bogus-butter compounds are daily placed upon the market, and that while it has been found most important for the welfare of the public to provide some ready and generally available means for detecting the presence of any of the bogus-butter compounds, which have of late been discovered by scientists both at home and abroad to be highly pregnant with various low forms of organic life, yet, as a matter of fact, the attempts heretofore made for detecting bogus-butter compounds—such, for example, as by saponification—have either proved unreliable or too tedious and expensive to render the same practically available to and within the range of either the public generally or even a majority of experts.

The object of my invention is to provide a simple, certain, and effective process for treating butter, or any article represented to be and resembling butter, so as to produce an article presenting to the eye an appearance which shall infallibly indicate whether the article contains simply the elements of pure genuine butter, or whether it is an imitation of such and contains more or less of any of the great variety of bogus-butter compounds.

The prominent and distinctive features of my process consist in subjecting the article represented to be butter to a gradually-increasing and uniformly-distributed temperature up to but not above such point as will cause a curd to first appear in those proteine compounds which coagulate at the lowest temperature of all other proteine compounds which may be present, and in then arresting the temperature at such point, so as to prevent as far as possible any chemical change or decomposition of the fat or the elimination of any excess of water or any other impurities from taking place, and further subjecting the article for a period of about ten minutes to a temperature approximating to but not above said curding-point, in order to complete the curding, and thereby bring the article into a condition which will clearly and invariably indicate the nature of the compound and the percentage of genuine butter if present in the mixture.

In carrying my invention into effect, a quantity of the real or supposed butter is placed within a suitable transparent receptacle—such, for example, as a glass tube closed at one end, or a so-called "hydrometer-jar." This glass receptacle is then heated by exposing it to a gradually-increasing temperature in such a way that the heat shall be uniformly distributed around the glass receptacle. This can be attained in several ways—as, for example, the glass vessel can be placed in a water bath which is gradually raised in temperature by the direct application of heat to the vessel containing the water, or, as another illustration, gas or air might be used in lieu of the water, the desideratum in all cases being that the receptacle containing the butter or butter compound shall be heated gradually by indirect heat, whereby the said article shall be gradually raised in temperature by heat uniformly distributed throughout the mass, and any liability of the compound being heated above the curding-point avoided, since ample opportunity is afforded for frequent inspection of the condition of the article. As the temperature rises the compound must be inspected frequently, so as to detect the instant the curding-point is reached, at which moment the further increase of temperature is checked, but the receptacle containing the article still subjected to a temperature not above the curding-point, this being readily attained by removing the vessel containing the water bath, for example, from the direct heat of the flame or heater over or upon which it has been placed, the heat remaining in the water bath, and the two vessels being found sufficient to then complete the curding in about ten minutes. I have found by experiment that without such removal from the direct heat as soon as the curding-point has been reached an entire change in the character of the results will be effected and the object in view defeated. After the last-mentioned step, the resulting article or mixture can be readily inspected by looking through the side of the glass vessel, the optical features therein manifested—such as absorption, refraction, and the peculiar phenomenon known as "complementary colors," which cause transparency, opaqueness, and various colors—serving to indicate the character or nature of the mixture.

It will be found in genuine butter treated by my process that its quality is indicated by the appearance of the fat, which will be transparent, and that the caseine or proteine compounds precipitated will amount to not less than three-tenths part of the whole mixture, but that in bogus-butter compounds the fat will be opaque, and the precipitate, if any, will fall short of three-tenths part, every fraction less than three-tenths part indicating a correspondingly-increased admixture of foreign fats.

The curding-point of the caseine in the article depends in a measure upon the melting-point of the fatty compound, but is not coincident with such point, as the curding-point increases regularly with the decrease of free lactic or mineral acid present in bogus-butter compounds.

Experiment demonstrates that the curding-point varies in different articles of butter or bogus-butter compounds, and since it is vital to my process that the increase of temperature above the curding-point should be avoided, the curding-point will in each instance be determined by observation. This can be readily determined by inspecting the character of the melted butter or bogus-butter compounds, since as soon as the curding-point is reached the article assumes a slightly flecked or curded appearance, which indicates that further increase of temperature should be checked, and that the article should then be subjected for a short period to a heat approximating to but not above the curding-point, so as to complete the curding. By such means only those proteine compounds which coagulate at the lowest temperature will be eliminated, and the elimination of water or any further chemical or mechanical change will be prevented.

What I claim as my invention is—

The herein-described process of treating butter and its bogus compounds, consisting in subjecting the article to indirect heat up to but not beyond the curding-point, and then subjecting the same to a temperature approximating to but not above the curding-point for a period, substantially as set forth, to complete the curding process, for the purpose described.

LORENZO FAGERSTEN.

Witnesses:
 CHAS. G. PAGE,
 WM. H. ROWE.